United States Patent [19]

Pan et al.

[11] Patent Number: 4,624,838

[45] Date of Patent: Nov. 25, 1986

[54] PROCESS FOR REMOVING ACIDIC GASES FROM GASEOUS MIXTURES USING AQUEOUS SCRUBBING SOLUTIONS CONTAINING HETEROCYCLIC NITROGEN COMPOUNDS

[75] Inventors: Yen-Chi Pan, Somerville; David W. Savage, Lebanon, both of N.J.

[73] Assignee: Exxon Research and Engineering Company, Florham Park, N.J.

[21] Appl. No.: 728,410

[22] Filed: Apr. 29, 1985

[51] Int. Cl.$^4$ .................... C01B 17/14; C01B 31/20
[52] U.S. Cl. .................................. 423/226; 423/228
[58] Field of Search ............... 423/226, 228, 243, 227

[56] References Cited

U.S. PATENT DOCUMENTS

| | | | |
|---|---|---|---|
| 4,112,052 | 9/1978 | Sartori et al. | 423/228 |
| 4,183,903 | 1/1980 | Melchior et al. | 423/228 |
| 4,336,233 | 6/1982 | Appl et al. | 423/228 |

Primary Examiner—Gregory A. Heller
Attorney, Agent, or Firm—Henry E. Naylor

[57] ABSTRACT

Disclosed is a process for removing acid gases from gaseous streams by contacting the stream with an aqueous scrubbing solution containing a heterocyclic nitrogen compound comprised of either a five—or six—membered ring having a pKa no greater than about 8. Imidazole is a preferred heterocyclic nitrogen compound.

18 Claims, 8 Drawing Figures

PROCESS FOR REMOVING ACIDIC GASES FROM GASEOUS MIXTURES USING AQUEOUS SCRUBBING SOLUTIONS CONTAINING HETEROCYCLIC NITROGEN COMPOUNDS

FIELD OF THE INVENTION

The present invention relates to an improved process for selectively removing acidic gases, particularly $CO_2$, from normally gaseous mixtures containing them. The gaseous mixtures are contacted with an aqueous scrubbing solution containing a heterocyclic nitrogen compound comprised of either a five- or six-membered ring and a specified low basicity. Examples of such heterocyclic nitrogen compounds are the imidazoles.

BACKGROUND

Purification of process gas streams by the removal of acid gases such as $CO_2$ and $H_2S$ is required in many major industrial processes such as hydrogen manufacture for refinery hydrotreating, synthesis gas manufacture from coal, purification of natural gas, and ammonia manufacture. Bulk removal of acid gases from such streams is usually accomplished by use of a scrubbing solution composed of a chemical or a physical solvent. The characteristic differences between chemical and physical solvents are that the chemical solvents chemically react with the acid gases during the absorption process. Chemical solvents generally have a relatively high heat of absorption of acid gases and they usually require heating for their regeneration. On the other hand, the physical solvents absorb acid gases by dissolution without chemical reaction. Physical solvents generally have a relatively low heat of absorption of $CO_2$ and usually require only depressurization for their regeneration. The capacity of physical solvents to absorb gas is approximately proportional to the partial pressure of the gas being absorbed. As the acid gas pressure increases from about 80 to 300 psig or more, the capacity of the physical solvents to absorb gases surpasses that of chemical solvents. In general, the higher the partial pressure of acid gas the greater the capacity advantage of physical over chemical solvents.

Physical solvents are increasingly being considered for use because many new gas manufacturing processes utilize higher pressures. Furthermore, because of the possibility of increasing energy costs, physical solvents have an economical advantage because they can be regenerated by depressurization as opposed to heating. However, because of the nature of true physical solubility, which consist only of weak interaction between gases and solvent, physical solvents have limitations such as: (1) high affinity for absorbing hydrocarbons, (2) low acid gas solubility at mode-rate acid gas pressure, and (3) low $H_2S/CO_2$ selectivity.

Consequently, there is a need in the art for solvents capable of absorbing acid gases which are not limited by the limitations of the conventional physical solvents but which can still be regenerated by depressurization.

SUMMARY OF THE INVENTION

In accordance with the present invention, there is provided a process for removing acid gases from gaseous feeds. The process comprises contacting the feed with an aqueous scrubbing solution comprising water and a heterocyclic nitrogen compound selected from the group consisting of imidazole, a $C_1$–$C_3$ alkyl-substituted imidazole where the alkyl groups are bonded to at least one carbon atoms, and a $C_1$–$C_3$ alkyl—or $C_2$–$C_3$ hydroxy alkyl-substituted piperazine where the hydroxy alkyl groups are bonded to both nitrogen atoms of the ring, the compound having a pKa no greater than about 8, under conditions whereby acid gases are absorbed by said scrubbing solution. The scrubbing solution is then regenerated under conditions whereby acid gases are desorbed from the solution.

In preferred embodiments of the present invention, the heterocyclic compound is selected from imidazole, 4-methyl imidazole, and N,N'-piperazine diethanol which is present in an amount of about 1 to 11 moles per liter of solution.

In still other preferred embodiments of the present invention the acid gases contained in the gaseous feed is substantially carbon dioxide.

When an imidazole is employed as the heterocyclic compound in amounts greater than about 5.5M, solid reaction products, which may be 1-imidazole carboxylic acid in the case of imidazole, are reversibly formed during the absorption step. Where such solids are formed, solvent circulation may be impeded. Therefore, it may be desirable in such systems to employ a reaction scheme which makes advantageous use of the large $CO_2$ absorption which occurs after solid formation. Two of such schemes are described below.

DETAILED DESCRIPTION OF THE INVENTION

Acid gas containing streams which may be treated in accordance with the present invention are those streams in which the partial pressure of the acid gas components are high enough to allow regeneration of the scrubbing solution used herein by depressurization. Non-limiting examples of acid gas components which may be contained in the stream include $CO_2$, $H_2S$, $SO_2$, $SO_3$, $CS_2$, HCN, and COS. In general, the acid gas component of typical acid gas containing streams have $CO_2$ and $H_2S$ as major components and the other aforementioned acid gases as minor components. It is preferred that the acid gas containing stream contain $CO_2$ as its major component with little or no other acid gases being present.

The scrubbing solutions of the present invention are comprised of an aqueous solution of one or more heterocyclic nitrogen compounds having a pKa no greater than about 8, preferably no greater than about 7.6, and most preferably from 6.5 to 7.6, to ensure that they will have a superior $CO_2$ cyclic capacity. Examples of such nitrogen compounds include the imidazoles in which one or more carbon atoms are bonded to a $C_1$–$C_3$ alkyl group and the piperazines in which both nitrogen atoms of the ring are bonded to a $C_2$–$C_3$ hydroxyalkyl group. Non-limiting examples of such compounds include imidazole. 2-methylimidazole, 4-methylimidazole, 5-methylimidazole, 1-ethylimidazole, 2-ethylimidazole, 1-propylimidazole, 4-propylimidazole, N,N'-piperazine propanol, N,N'-piperazine diethanol, and the like. Preferably, the heterocyclic nitrogen compounds of the present invention are selected from the following:

| Compound | pka | m.p. (°C.) | b.p. (°C.) |
|---|---|---|---|
| <br>imidazole | 6.95 | 89–91 | 256 |
| <br>2-methylimidazole | 7.86 | 142–143 | 267–168 |
| <br>4-methylimidazole | 7.52 | 46–48 | 263 |
| CH$_2$CH$_2$OH<br>N<br>⌠ ⌡<br>N<br>CH$_2$CH$_2$OH<br>N,N'—piperazine diethanol | 7.0 | 136 | 215–220° C./50 mm |

Most preferably the heterocyclic nitrogen compounds are imidazole, 4-methylimidazole and N,N'-piperazine diethanol.

In the practice of the present invention, the acid gas containing stream may be contacted with the scrubbing solution in any suitable contacting tower. Non-limiting types of towers which may be used in the practice of the present invention include both packed and trayed towers.

In a preferred mode of practicing the present invention, absorption of the acid gases is accomplished by passing the feed stream and the scrubbing solution countercurrent to each other in an appropriate tower. The temperature of the scrubbing solution during absorption is an effective temperature. By effective temperature we mean a temperature at which the scrubbing solution remains in liquid form. Generally, this temperature will range from about −10° C. to about 200° C., preferably from about 0° C. to about 100° C. Pressures may vary from about 50 to about 5000 psia, preferably about 200 to about 1500 psia in the absorber.

The time of contacting the gaseous mixture with the aqueous scrubbing solution may vary from a few seconds to minutes, for example, 5 minutes.

After contacting the gaseous mixture with the aqueous scrubbing solution until a capacity of at least 80%, or preferably at least 90%, of the solution is utilized, it must be regenerated. Regeneration of the aqueous scrubbing solution may be accomplished at temperatures from about 20° C. to 200° C. and at pressures from about 15 to 1000 psia, preferably 15 to 200 psia. This is usually accomplished by decreasing the pressure and/or increasing the temperature of the scrubbing solution to a point at which the absorbed acid gases flash off. Preferably, the regeneration occurs by depressurization because this reduces the energy input required to effect the separation of $CO_2$ from the feed gas. The addition of an inert gas, e.g., air, $N_2$ or steam, during the regeneration of the scrubbing solution, is also within the scope of the present invention. The process of regeneration is more particularly described in U.S. Pat. No. 3,848,057 which is incorporated herein by reference. The heterocyclic compounds of the present invention require a lower solvent circulation rate as compared with the prior art amines, e.g., diisopropanolamine and 2-piperidine ethanol run under the same desorption conditions. Thus, a savings is realized in the steam used to heat and purge the aqueous amine absorption solution during the regeneration step.

The compounds of the present invention are selected such that they have relatively low volatility to avoid loss thereof during absorption and desorption. The compounds preferably have a boiling point of at least 200° C., more preferably at least 250° C.

The aqueous scrubbing solution containing the heterocyclic nitrogen compounds of the present invention and water may also include commonly used additives such as surfactants, antifoaming agents, antioxidants, corrosion inhibitors, etc. Examples of such additives include arsenious anhydride, selenious and tellurous acid, protides, aminoacids, e.g., glycine, vanadium oxides, e.g., $V_2O_5$, chromates, e.g., $K_2Cr_2O_2$, and the like.

Two characteristics which are of ultimate importance in determining the effectiveness of the heterocyclic nitrogen compounds herein for acid gas removal are "loading" and "capacity". The term "loading" means the concentration of the acid gas physically dissolved in and chemically combined with the absorbent solution as expressed in g-moles of acid gas per mole of heterocyclic compound.

"Capacity" is defined as the g-moles of acid gas loading in the absorbent solution at the end of the absorption step minus the g-moles of acid gas loading in the absorbent solution at the end of the desorption step. High capacity enables one to reduce the amount of heterocyclic nitrogen compound solution to be circulated and use less heat or steam during regeneration. The best heterocyclic nitrogen compounds are those which exhibit the highest capacity level.

While not being bound to any one theory it is believed that the large reversible swing of $CO_2$ solubility which occurs on changing the $CO_2$ partial pressure over the solution due to formation of unidentified but expected to be, e.g., 1-imidazole carboxylic acid if imidazole is employed. For example, at from about 3 to 5.5M imidazole a conventional apparatus may be employed, whereas, at above about 6M and up to 11M, imidazole solution solids begin to appear in the solution. At about 10M imidazole solution about ¾ of the total cyclic capacity occurs after the solids precipitation and the slurry thereby formed changes the pumping characteristics of the system and renders slurry circulation difficult. Two reaction schemes which are proposed herein to overcome this problem are described below.

Figure 6A:
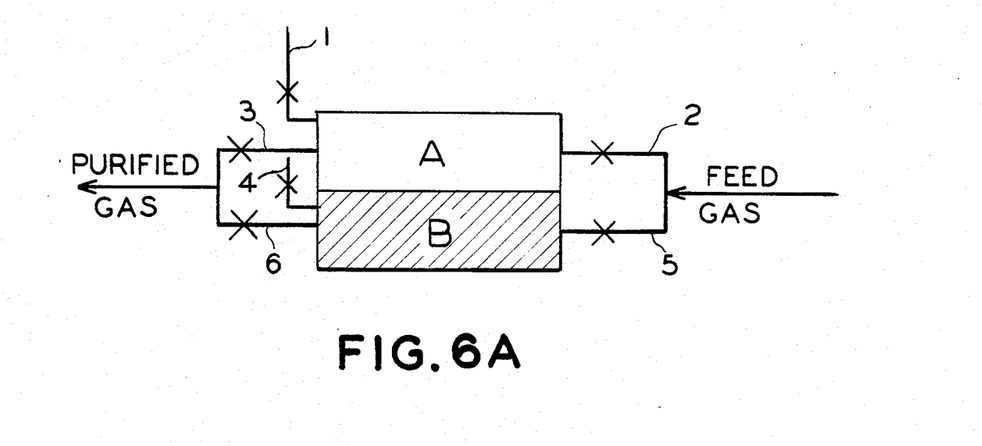
FIGS. 6a and 6b illustrate one reaction configuration to eliminate problems of solids circulation in the process of this invention.
Figure 6B:
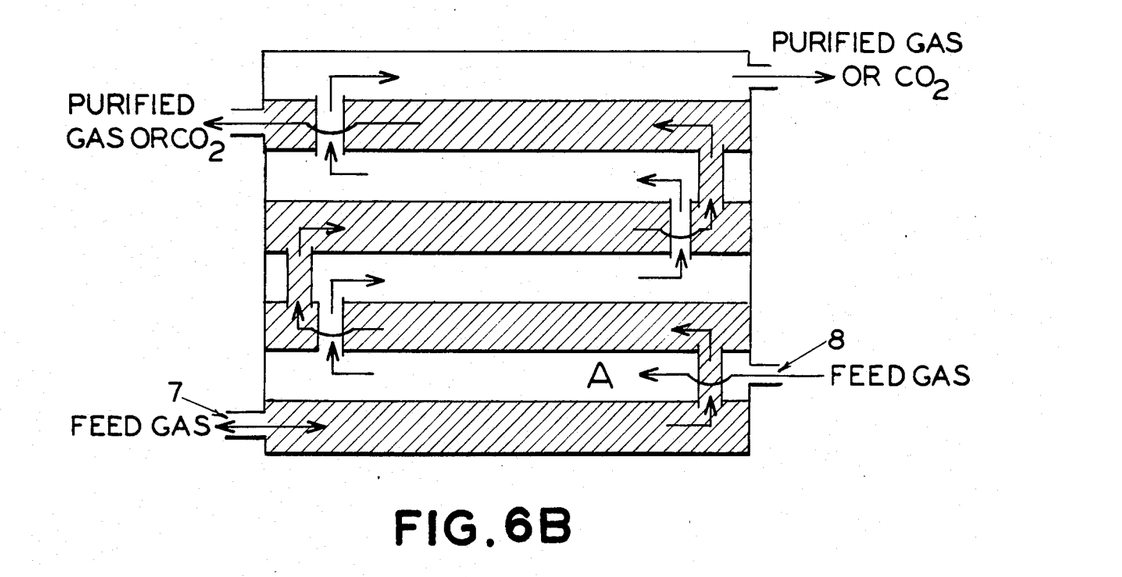

The first scheme, shown in FIGS. 6a and 6b, is for bulk removal of $CO_2$ taking advantage of the large $CO_2$ absorption capacity which occurs after the reversible solid formation. As shown in FIG. 6a one configuration consists of at least two reactors A and B for continuous operation. These reactors are operated alternately between absorption and regeneration. When reactor A is undergoing $CO_2$ absorption, the vent 1 of the reactor is closed and the feed gas is passed via the open valve in pipe 2 through the absorbent solution in the reactor and exited through open pipe 3 as purified gas. Simultaneously, reactor B is undergoing regeneration of the absorbent solution where the vent 4 of the reactor is open for $CO_2$ removal and the valves in pipes 5 and 6, respectively, are closed to prevent flow of the feed gas. As reactor A exhausts its absorption capacity the operation of the two reactors is reversed and so forth so that the reactors alternate in their functions. In this scheme no solvent circulation occurs because the absorbent solution or slurry is retained in each reactor.

The reactors in the configuration may be spaced sequentially, i.e., one on top of or next to the other, as shown in FIG. 6b, so as to maximize the common heat-transfer surfaces for better heat integration. Thus, in FIG. 6b the feed gas is injected either at the inlet point 7 of reactor B or at the inlet point 8 of reactor A and is circulated upward through the various channels in the direction given. As the feed gas circulates through one reactor system of channels the $CO_2$ gas is simultaneously dispelled from the absorbent solution in the other reactor system of channels and exits through a vent at the top of the configuration.

In either scheme FIG. 6a or 6b packing material may be present in the reactors to increase the gas-liquid contact. For greater regeneration of the solvent, air stripping may be employed. This system can be used in conjunction with other conventional processes for greater $CO_2$ removal.

Figure 7:
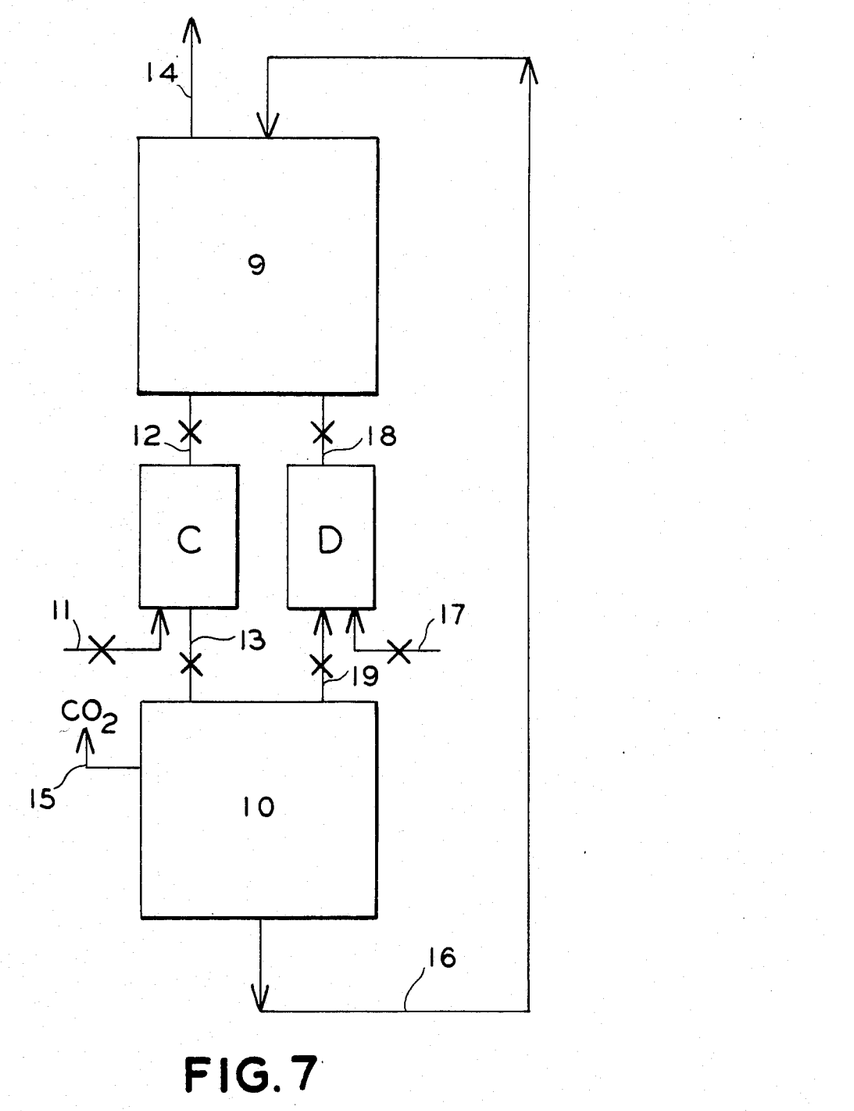
FIG. 7 illustrates a second reacation configuration to eliminate problems of solids circulation in the present process.

Another scheme, which integrates the bulk and deeper $CO_2$ removal and is a modification of the conventional liquid circulation process, is shown in FIG. 7. As with the conventional process, this scheme contains an absorption unit 9 and flash unit 10. The bulk removal unit is comprised of two reactors C and D which are operated alternatively between absorption and regeneration as described for the scheme in FIGS. 6a and 6b. In this scheme, the feed gas and the absorbent solution flow countercurrently. If absorption is being carried out in, for example, reactor C, the feed gas enters the reactor through pipe 11 and is passed through reactor C and passed out through line 12 to absorption unit 9. Pipe 13 is closed to the flash unit 10. The $CO_2$ in the feed gas is partially absorbed by the partially loaded absorbent solution as it flows into the reactor from the absorbent unit. The purified gas leaves the absorption unit via line 14. The absorbent solution accumulates in reactor C for further absorption. When the reactor fills up with sufficient solvent the reactor switches to a regeneration mode and the other reactor (D, if reactor C was first used) simultaneously switches to an absorption mode from a regeneration mode. When reactor C is on regeneration mode, line 12 is closed and line 13 to the flash unit 10 is opened. The slurry created by the regeneration begins to flow from reactor C to the flash unit through line 13. When the reactor pressure is reduced, the slurry is converted to a pumpable liquid by releasing the absorbed $CO_2$ through pipe 15. The regenerated liquid solution is removed from the flash unit through line 16 and piped to the absorption unit for continuous recycling. When the solution is completely removed from the reactor, the operation of reactors C and D is reversed and the process continues. This scheme eliminates the problem of reversible solids formation. The same discussion regarding reactor C applies to reactor D. Thus, lines 11, 12 and 13 of the reactor C scheme correspond to lines 17, 18 and 19, respectively, of the reactor D scheme.

The following examples serve to more fully describe the manner of practicing the above described invention as well as to set forth the best modes contemplated for carrying out various aspects of the invention. It is to be understood that these examples in no way serve to limit the true scope of this invention, but rather, are presented for illustrative purposes.

EXAMPLE 1

$CO_2$ Absorption Using Imidazole

Figure 1:
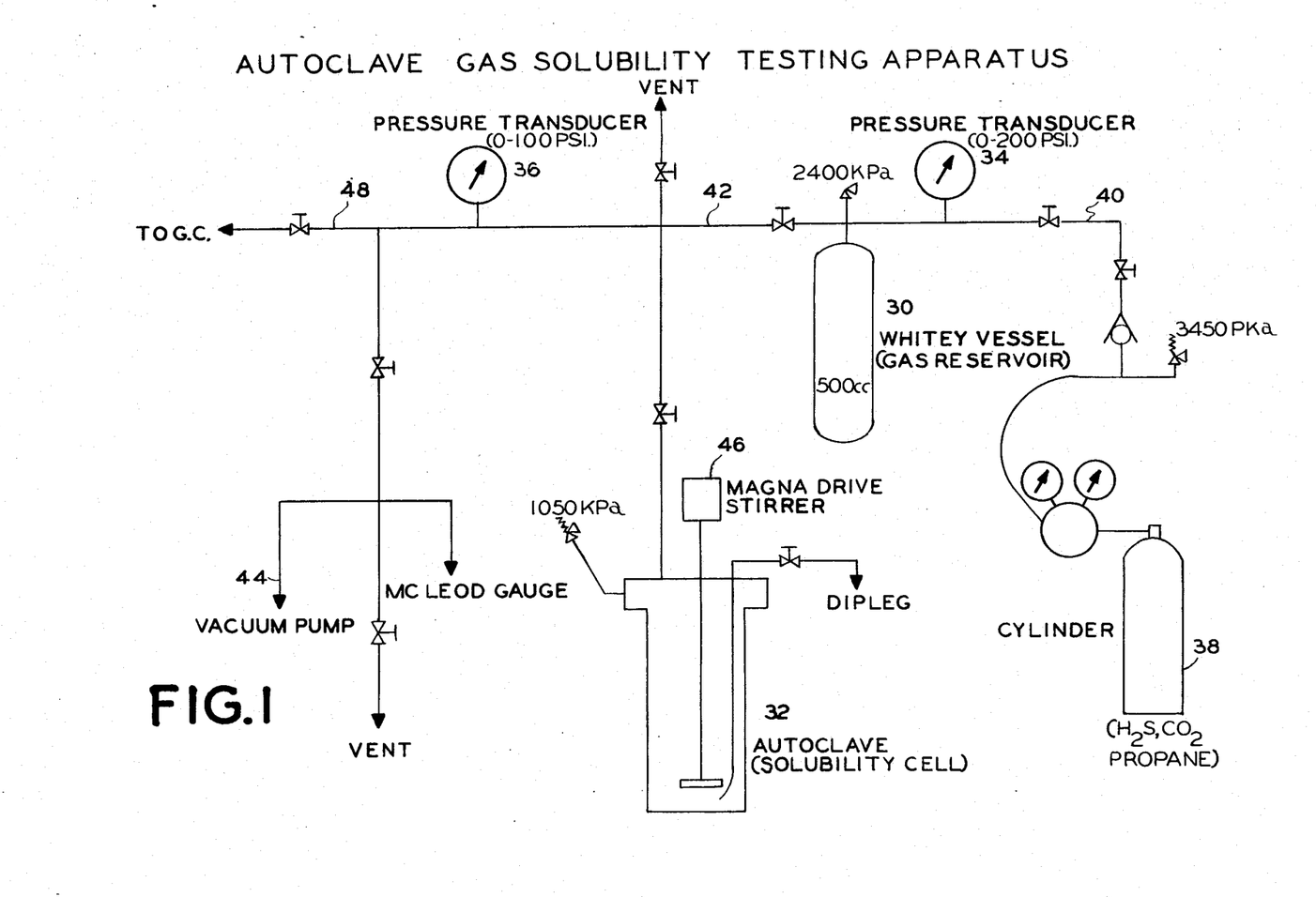
FIG. 1 illustrates the autoclave gas solubility testing apparatus employed in the examples herein.

The solubility of $CO_2$ (loading) in aqueous imidazole solutions of three concentrations, 10.7M, 8.0M and 5.4M was determined at different temperatures and pressures up to 100 psi using the apparatus of FIG. 1. The apparatus consists of four major ports, a vacuum system, a gas handling system, a gas reservoir and a solubility cell. The gas solubility was measured by charging a known amount of the $CO_2$ from the reservoir 30 into the evacuated solubility cell (autoclave) 32 containing certain amount of the imidazole solution. The temperature of the solubility cell was maintained at the desired temperature level by using a constant temperature bath. The pressures and temperatures of the reservoir 30 and solubility cell 32 were monitored by pressure transducers at 34 (0-200 psia) and 36 (0-100 psia) and by thermocouples. The solubility of the $CO_2$ was then determined by the pressure and temperature changes in these compartments after the pressure in the cell reached equilibrium.

In the particular scheme, $CO_2$ gas from the cylinder 38 is pumped to the reservoir 30 (300 cc) via pipe 40. The gas is then piped through pipe 42 to the top of the solubility cell 32 which contains the solution. The cell has been previously evacuated by vacuum pump 44, and the solution is stirred via stirrer 46. The gas stream is then taken via pipe 48 to the gas chromatograph for evaluation.

Figure 2:
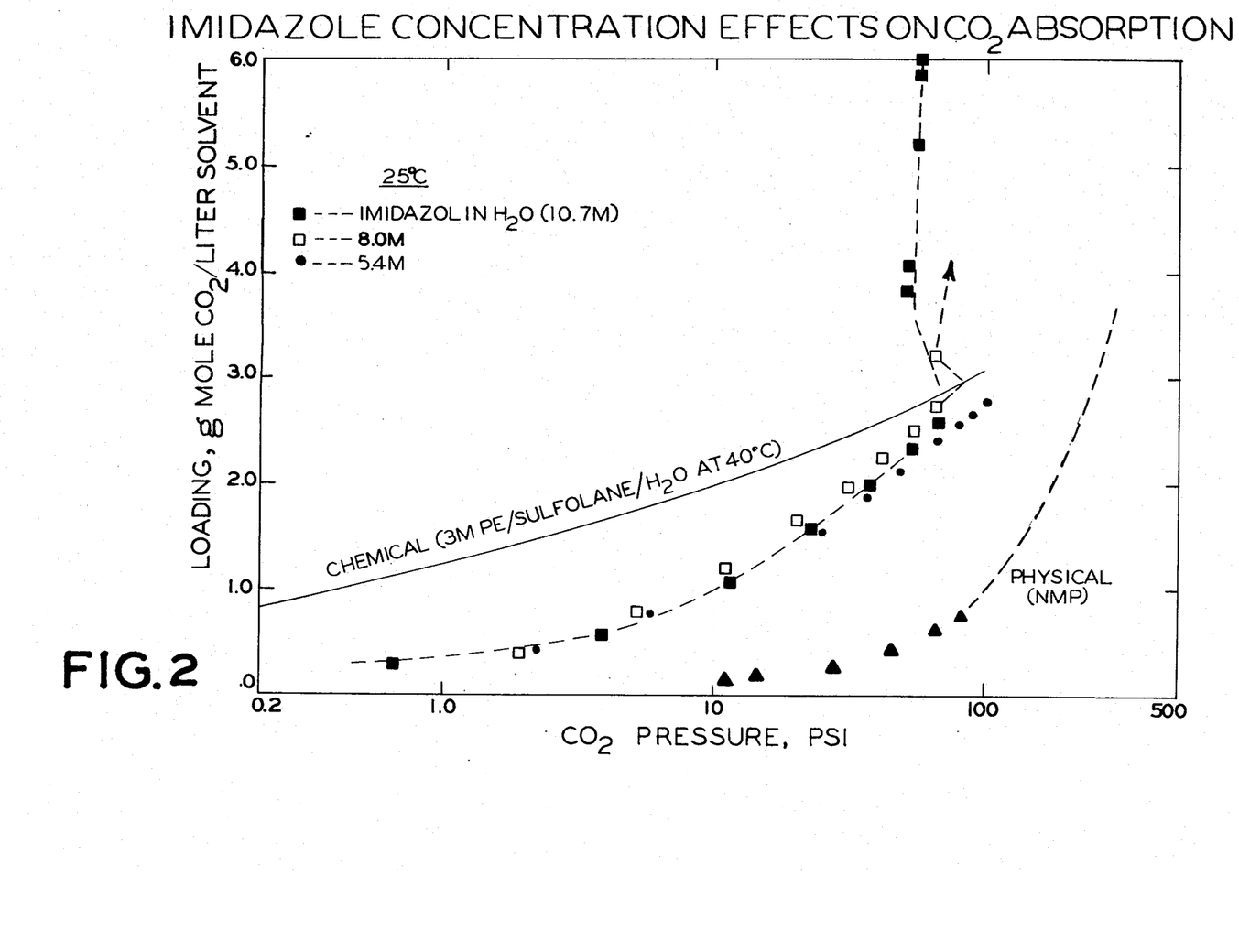
FIG. 2 illustrates graphically a plot of $CO_2$ loading of imidazole at various concentrations as compared to other physical and chemical solvents.

The $CO_2$ solubilities of the three solutions are shown in FIG. 2. As the figure shows, the $CO_2$ loading in the 5.35M solution increases smoothly with increasing $CO_2$ pressure. This solution gives a significant swing of $CO_2$ solubility with pressure which is at least twice that possible with the common physical solvents such as N-methylpyrrolidone (NMP) and Selexol mixtures of dimethylether of polyethene glycol. As the imidazole concentration increases, the $CO_2$ loading v. $CO_2$ pressure curve does not change significantly at $CO_2$ loadings below about 2.5 moles/liters of solvent. With the concentrated (10.7M) solution, addition of $CO_2$ above about 2.5 moles/liter caused the $CO_2$ pressure to drop back to about 50 psi, and the solution exhibited a sharp increase in absorption capacity with a relatively small change in $CO_2$ pressure over the solution. Similar behavior occurred in the 8.0M solution. The total $CO_2$ absorption capacity in moles was close to the number of moles of imidazole in the solution.

The unusually large swing of $CO_2$ loading in concentrated imidazole solution was shown by experiments conducted in a glass cell to be associated with the formation of a solid precipitate. The precipitate has not been positively identified because the slurry readily releases $CO_2$ to regenerate imidazole solution as the $CO_2$ pressure is reduced, but is believed to be 1-imidazole carboxylic acid, which is unstable and loses $CO_2$ readily to yield imidazole when $CO_2$ pressure is lowered. The precipitation apparently occurs as the concentration of the solid exceeds its solubility limit of about 2.5 moles per liter at 25° C. As the solid precipitates from the solution, the equilibrium shifts to allow absorption of large amounts of $CO_2$ with a small change in $CO_2$ pressure.

EXAMPLE 2

Use of Imidazole Derivatives

A. 4-Methylimidazole

Figure 3:
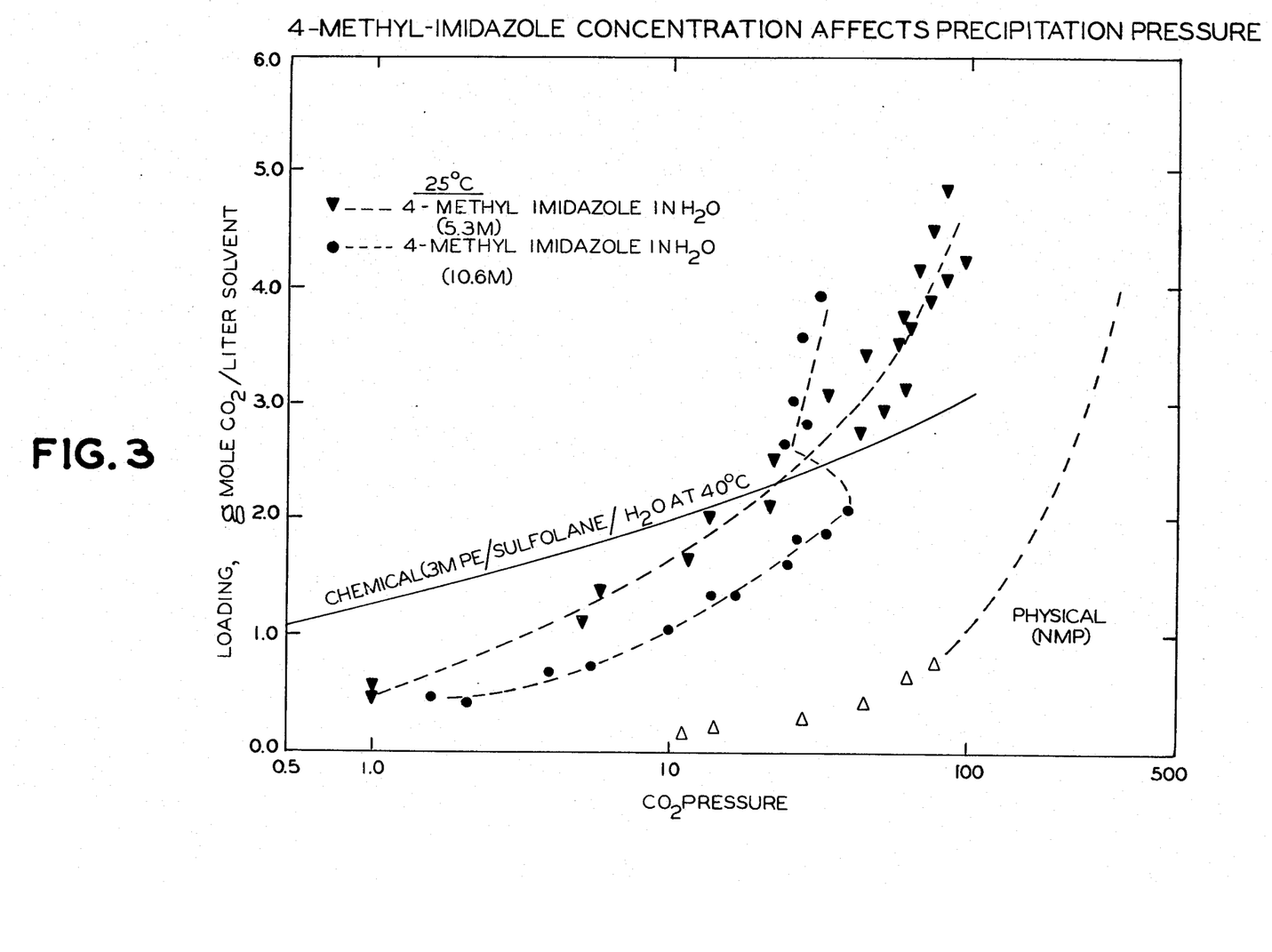
FIG. 3 illustrates graphically a plot of $CO_2$ loading of 4-methylimidazole at various concentrations versus $CO_2$ partial pressure.

Aqueous solutions containing 10.6M and 5.3M of 4-methylimidazole were tested for their $CO_2$ solubilities at 25° C. as described in Example 1. As the results show in FIG. 3, the $CO_2$ loading increases as the solution concentration decreases. This may be due to aggregation among the 4-methyl imidazole molecules in the more concentrated solution which reduces the available reaction sites with the substituted imidazole. This observed concentration effect is more pronounced with substituted imidazole than with imidazole, for which the $CO_2$ solubility remained approximately the same between 5.4M and 10.7M concentrations.

In 5.3M 4-methylimidazole solution, similar to 5.4M imidazole solution, a significant swing of $CO_2$ solubility was found upon changing the $CO_2$ partial pressure over the solution. The $CO_2$ solubility vs. $CO_2$ pressure curves basically were parallel, with the solubility curve for 4-methylimidazole lying above that of imidazole. This higher capacity of the former solution may be related to the slightly higher basicity of the derivative. In addition, when 10.6M 4-methylimidazole solution was employed there was a sharp increase in $CO_2$ absorption capacity with a relatively small change in $CO_2$ pressure. This large absorption capacity is associated with reversible formation of a solid reaction product, which forms and precipitates out at 25° C. when $P_{CO_2}$ exceeds about 25 psia (in contrast to about 50 psia for imidazole). This significant reduction in equilibrium pressure may be a desirable feature for the bulk $CO_2$ removal. The absorption and regeneration rates for $CO_2$ in these solutions have not been specifically studied; nevertheless, the release of $CO_2$ during the regeneration of 4-methylimidazole solution by depressing appears to be slower than that of imidazole.

The $CO_2$ solubilities in 5.3M 4-methylimidazole solution were also determined at 10° and 40° C. The solubility curve at 40° C. showed a smooth increase in loading with increasing pressure. At 25° C. and 10° C., slight deviations from the smooth curve occurred. These deviations were also observed in 10° C. measurements for imidazole solution.

B. 2-Methylimidazole

Figure 4:
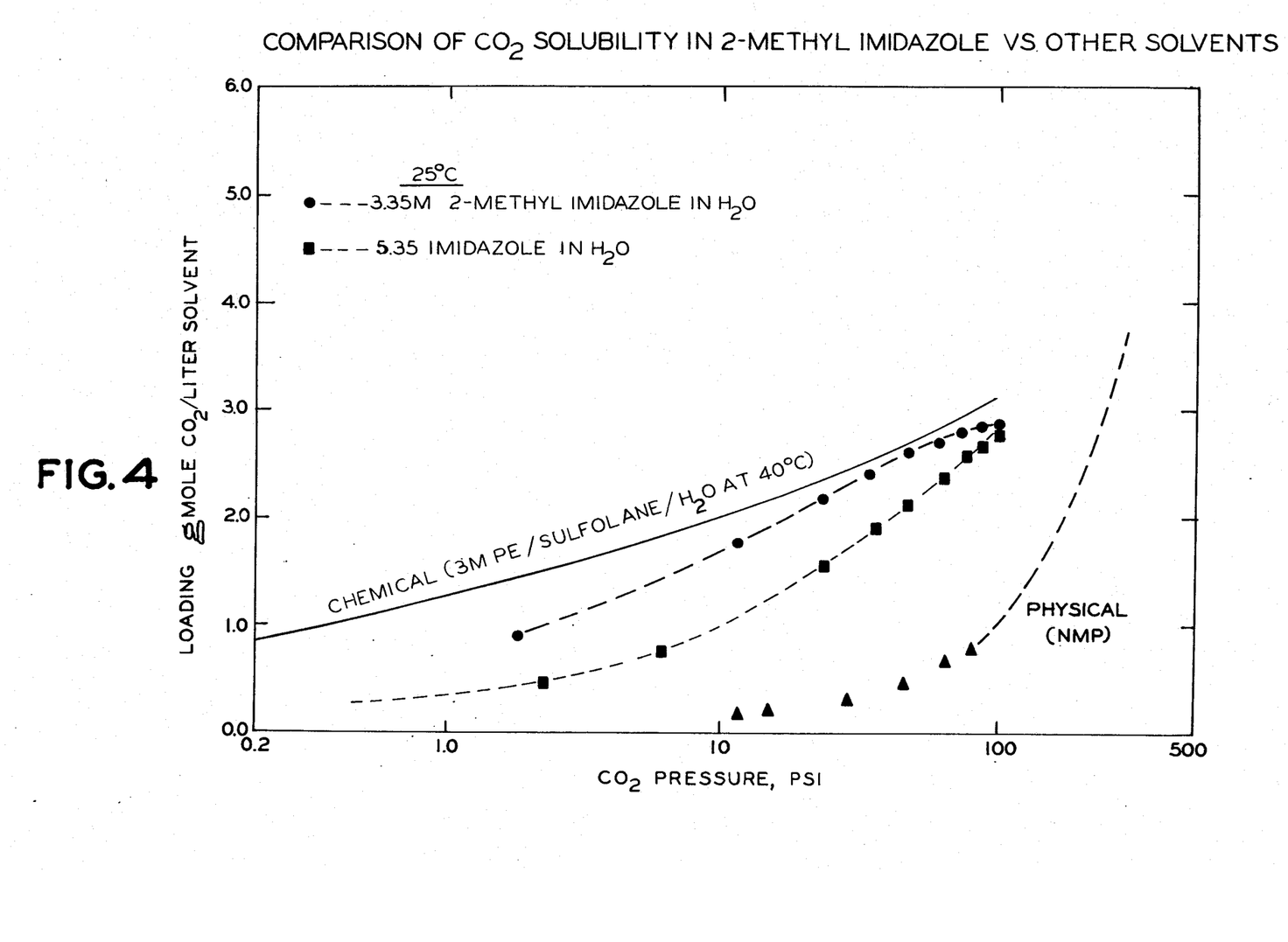
FIG. 4, illustrates graphically, a comparison of $CO_2$ solubility in 2-methyl imidazole compared to other solvents at various concentrations.

The $CO_2$ solubilities in 3.4M 2-methylimidazole solution, which is near it solubility limit, were determined at 25° C. As can be seen in FIG. 4, the solubility curve had a shallower slope than that of imidazole solution, showing that the 2-methylimidazole is not as good a weak base solvent as imidazole or 4-methylimidazole.

EXAMPLE 3

N,N'-Piperazine Diethanol $CO_2$ Absorption

Figure 5:
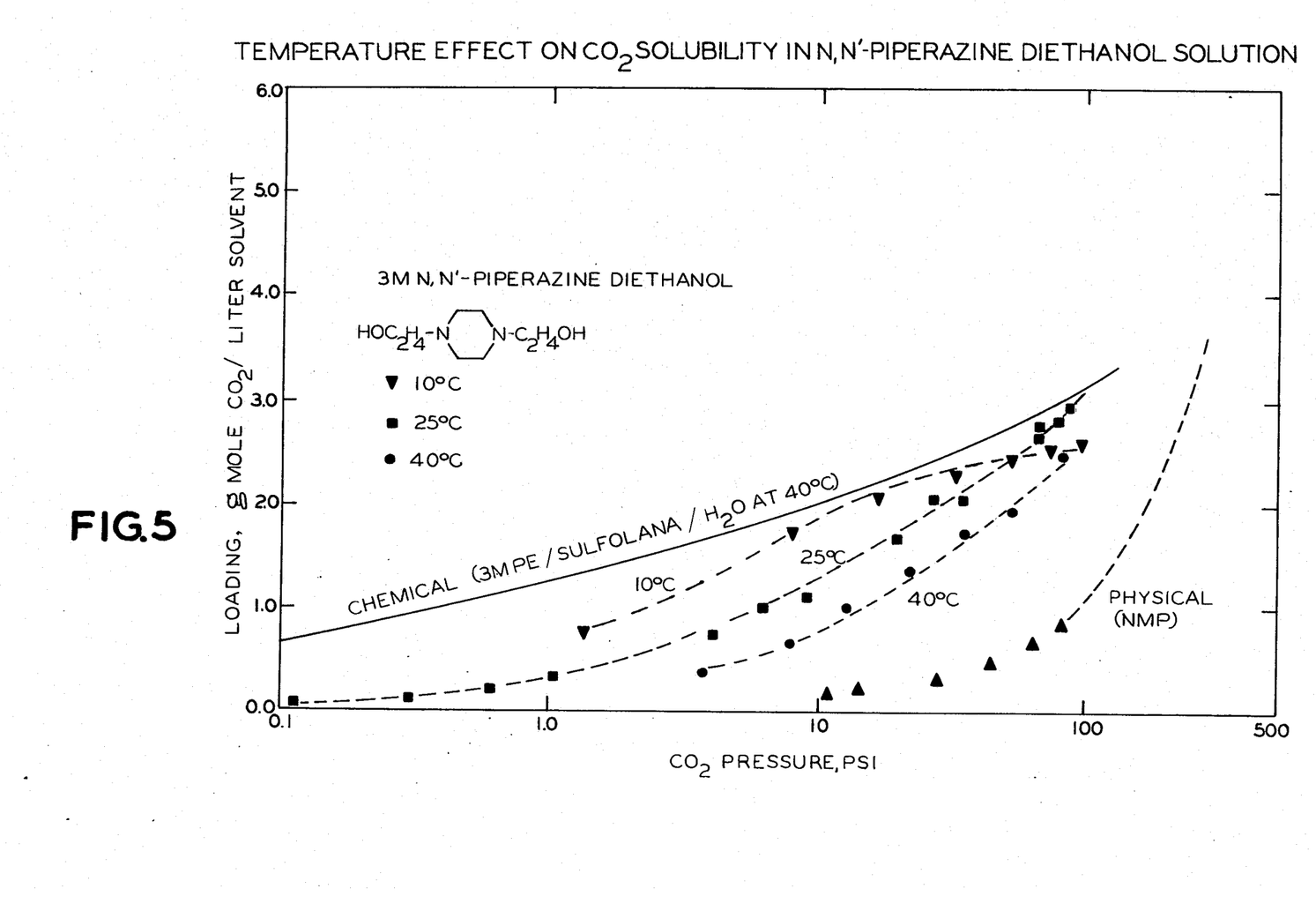
FIG. 5 illustrates graphically the temperature effect on $CO_2$ solubility of N,N'-piperazine diethanol at three temperatures versus $CO_2$ partial pressure.

N,N'-piperazine diethanol, another weak base ($pK_a=7$), was also studied in a 3M solution in water. The $CO_2$ solubilities are plotted in FIG. 5 at three temperatures, 10°, 25°, and 40° C. As the data show, the solubilities and their dependence on pressure are similar to those of imidazole solutions at 25° and 40° C. However, the solubility curve for 10° C. shows some deviation from the normal curvature at loading above 1.5 mole $CO_2$/liter. This deviation may be due to some of the N,N-piperazine diethanol being salted out from the solution, since this type of deviation in the shape of solubility curve only occurs in experiments conducted with nearly saturated base solutions.

EXAMPLE 4

$K_2HPO_4$ as Physical Solvent (Comparative)

The solubility of $CO_2$ was studied briefly in an inorganic weak base, 4M $K_2HPO_4$ ($pK_a=7.2$). The change of $CO_2$ cyclic capacity between 100 and 1 psia was found to be about the same as that or organic physical solvents such as N-methylpyrrolidone. However, this is less than half of that in imidazole and N,N-piperazine diethanol.

What is claimed is:

1. A process for removing acid gases selected from hydrogen sulfide and carbon dioxide from gaseous feeds which process comprises: contacting the feed with an aqueous scrubbing solution comprising water and 1 to 11 moles of a heterocyclic nitrogen compound per liter of solution which compound is selected from the group consisting of imidazole, a $C_1$-$C_3$ alkyl-substituted imidazole where the alkyl groups are bonded to at least one carbon atom, and a $C_1$-$C_3$ alkyl- or $C_1$-$C_3$ hydroxyalkyl-substituted piperazine where the alkyl or hydrozyalkyl groups are bonded to both nitrogen atoms of the ring, the compound having a pKa no greater than about 8, at conditions whereby acid gases are absorbed by said scrubbing solution.

2. The process of claim 1 wherein the amount of heterocyclic compound in the scrubbing solution is from about 3 to 5.5 moles per liter of solution.

3. The process of claim 1 wherein the heterocyclic compound is imidazole, 4-methyl imidazole, or N,N'-piperazine diethanol.

4. The process of claim 3 wherein the heterocyclic compound is imidazole.

5. The process of claim 1 wherein the scrubbing solution additionally contains an additive selected from the group consisting of surfactants, antifoaming agents, antioxidants, corrosion inhibitors and mixtures thereof.

6. The process of claim 1 wherein the contacting is conducted at a temperature ranging from about 0° to about 100° C. and at a pressure ranging from about 200 to about 1500 psia.

7. The process of claim 1 wherein the regenerating is conducted at a temperature in the range from about 20° to about 200° C. and at a pressure ranging from about 15 to about 200 psia.

8. The process of claim 1 wherein the scrubbing solution is regenerated by desorption of acid gases.

9. The process of claim 7 wherein the scrubbing solution is regenerated by desorption of acid gases.

10. A process for removing carbon dioxide from a normally gaseous feed, which process comprises: contacting the feed with an aqueous scrubbing solution comprising water and 1-11 moles of one or more heterocyclic compounds per mole of solution which compounds are selected from imidazole, 4-methyl imidazole, and N,N-piperazine diethanol, at conditions whereby carbon dioxide is absorbed by the scrubbing solution.

11. The process of claim 10 wherein the scrubbing solution is regenerated by desorbing carbon dioxide.

12. The process of claim 11 wherein the amount of heterocyclic compound in the scrubbing solution is from about 3 to 5.5 moles per liter of solution.

13. The process of claim 10 wherein the heterocyclic compound is imidazole.

14. The process of claim 13 wherein the heterocyclic compound is imidazole.

15. The process of claim 11 wherein the scrubbing solution additionally contains an additive selected from the group consisting of surfactants, antifoaming agents, antioxidants, corrosion inhibitors and mixtures thereof.

16. A process for substantially completely removing carbon dioxide from a normally gaseous feed, which process comprises, in sequential steps:
(a) contacting the feed with an aqueous scrubbing solution comprising water and imidazole wherein the total imidazole concentration in the solution is in the range from about 1 to about 11 moles per liter, said contacting being conducted at a temperature ranging from about 0° to 100° C. and at a pressure from about 200 to 1500 psia, thereby to absorb the carbon dioxide containing acidic gas in said scrubbing solution, and
(b) regenerating said scrubbing solution at a temperature in the range from about 20° to 200° C. and at a pressure ranging from about 15 to 200 psia thereby to desorb the carbon dioxide containing acidic gas from the scrubbing solution.

17. The process of claim 16 wherein the imidazole is present in a molar concentration of greater than 5 and the absorption step and desorption step are carried out simultaneously in one of two adjacent reactors wherein each reactor absorption and regeneration in sequence and alternately with the other reactor.

18. The process of claim 16 wherein the imidazole is present in a molar concentration of greater than 5 and the absorption step and desorption step are carried out simultaneously in one of two reactors which are both connected to an absorption unit and flash unit which units are interconnected via a line for recycling regenerated scrubbing solution to the absorption unit, wherein each reactor undergoes adsorption and regeneration in sequence and alternately with the other reactor, changing the steps automatically when the scrubbing solution becomes saturated with carbon dioxide and the solution, rich in carbon dioxide, becomes regenerated.

* * * * *